A. D. ELSTER.
GASOLENE STRAINER.
APPLICATION FILED MAR. 4, 1912.
1,093,258.
Patented Apr. 14, 1914.
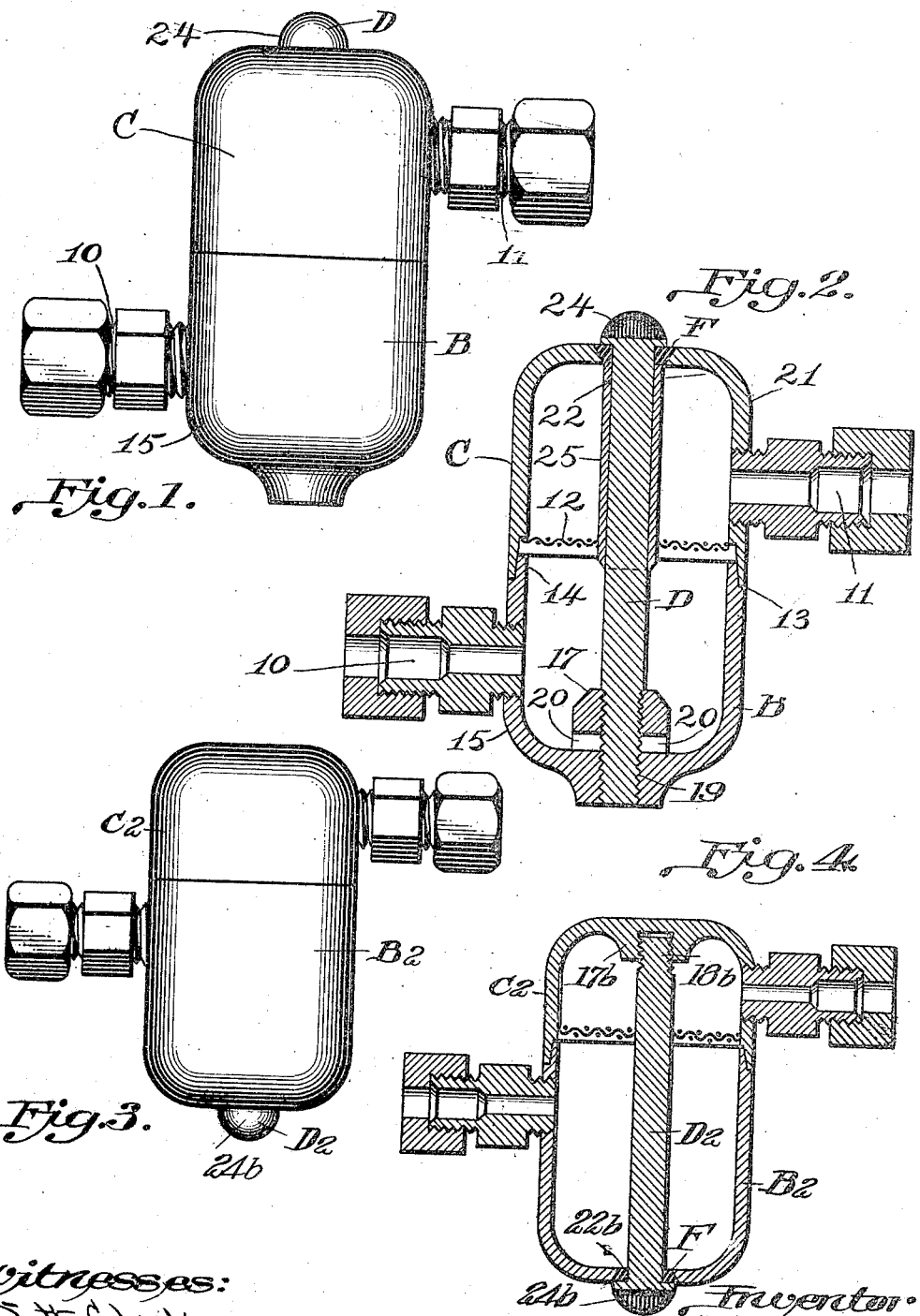

UNITED STATES PATENT OFFICE.

ALBERT D. ELSTER, OF MERIDEN, CONNECTICUT.

GASOLENE-STRAINER.

1,093,258.  Specification of Letters Patent.  Patented Apr. 14, 1914.

Application filed March 4, 1912. Serial No. 681,533.

*To all whom it may concern:*

Be it known that I, ALBERT D. ELSTER, a citizen of the United States, residing at Meriden, in the county of New Haven and State of Connecticut, have invented certain new and useful Improvements in Gasolene-Strainers, of which the following is a specification.

My invention relates to improvements in gasolene strainers for use in the line of the supply for internal combustion engines on automobiles and motor cycles, and the object of my improvement is simplicity and economy in construction and convenience and efficiency in use.

In the accompanying drawing:—Figure 1 is a side elevation of one form of my improved gasolene strainer. Fig. 2 is a sectional view of the same. Fig. 3 is a side elevation of another form of my improved gasolene strainer. Fig. 4 is a sectional view of the same.

My strainer is an elongated egg-shaped structure and comprises two main members respectively a bottom or lower member B and an upper or top member C that are adjustably and separably connected together, having an inlet 10 suitable for being connected to the gasolene supply tank, an outlet 11 suitable for being connected to the carbureter and a strainer proper 12 bridging the interior structure. The bottom member B and top member C are hemi-spherical structures and are joined adjacent the equatorial plane by a joint 13 of special character comprising an inner conical portion and an outer radial or plane portion which joint is carefully ground and assures a tight fit so as to prevent leakage of gasolene when the parts are held engaged in normal position and also will permit turning the said bottom member B and top member C axially relatively one to the other so as to permit of changing the angular positions of the inlet 10 and outlet 11 relatively one to the other. An axially positioned screw D serves to secure the members B and C together in a manner to be described.

The bottom member B comprises a hemispherical shell-like structure having the inlet 10 extending radially from the body portion 15 and has the top shaped to form one of the members of the joint 13 comprising the conical portion 14 on the inner side and the flat portion 15 in the radial plane on the outer side. The interior at the bottom is provided with a boss 17 that extends axially upward. An axial hole or bore 19 extends through the boss 17 and downwardly through the bottom wall of the bottom member and which is screw threaded. Radial inlet holes 20 connect the interior of the body of the bottom member B with the bore 19, and serve thereby to provide connections leading laterally from the said interior to said bore 19.

The upper member C comprises a hemispherical shell-like structure having a bottom edge that is formed the counter part of the conical portion 14 and radial portion 15 of the bottom member and coöperates therewith to form the joint 13 and is provided with the outlet 11 extending radially from the body portion 21 thereof. The top at the pole is provided with an axial hole 22 which is preferably recessed or countersunk suitably to form a seat for the bottom side of the head 24 of the screw or bolt D and the same may engage with the said head 24 directly or a packing washer F may be interposed therebetween. A sleeve 25 extends axially downward from the hole 22 for a greater part of the body portion 21 and serves as a guide to give axial direction to the screw D when inserted in the hole 22 and suitably to guide the same to the threaded bore 19 in the boss 17 and also prevents damage to the strainer proper 12 by the insertion of the screw D. The said screen or strainer proper 12 is positioned in the upper member C and comprises a sheet of wire gauze of suitable mesh and of proper size to bridge the space across the interior of the body portion, being provided with a central hole to admit the sleeve 25. The screw or bolt D is of suitable length to engage the hole 22 of the upper member C by the head 24 and the lower member B by the threaded lower end engaging the threaded bore 19 of the boss 17 and to hold the said members engaged at the joint 13. When the said members are held together in the manner described the structure described is entirely closed to prevent the escape of gasolene, and the same serves to filter or strain the gasolene supplied to the carbureter by reason of the gauze strainer 12, and the bottom portion B operates as a reservoir to collect water and foreign matter as mentioned. The angular relation of the inlet and outlet may be changed as desired, the screw D being preferably loosened and again tightened in effecting any change in adjustment.

In the type described flushing is effected by raising the screw D in the lower portion thereof, below the lateral holes 20, thus opening a passage from the interior space through the bottom wall of the bottom member B.

This type of device provides a straining device that is compact, safe, and reliable and permits of easily flushing without separation of the top and bottom member.

The joint 13 as stated is a ground joint, the greater portion thereof consisting of the taper or conical portion 14 the radial or plane portion 15 being of relatively small extent and is provided partly for the purpose of forming a broken joint and also to provide a finish, so that the exposed portion of the joint will be essentially a true circle or at least will be in a single plane and essentially at right angles to the axis or in a radial plane. Both portions of the joint are ground and coöperate to effect a gasolene tight joint.

The type of device shown is suitable either for automobiles or motor cycles.

In Figs. 3 and 4 are shown another modification of my gasolene strainer that is suitable for a diminutive type, such as is adapted for use with motor cycles, and which has advantages over the type shown in Figs. 1 and 2 in being better adapted to be made tight against leakage of gasolene. In this type the holding screw $D^2$ is inverted, the pole of the top member $C^2$ is closed on the outside and provided on the inner side with a downwardly projecting boss $17^b$ that is threaded as shown at $18^b$ to receive the threaded upper end of the said holding screw $D^2$. The lower member $B^2$ is provided at the lower pole with the tapered hole $22^b$ suitable for receiving the head $24^b$ of the holding screw $D^2$, preferably with the packing washer F interposed therebetween. In this type the flushing is effected by loosing the holding screw a little so as to drop the head $24^b$ of the screw $D^2$ away from the hole $22^b$ and permit the escape of water and foreign matter from the interior.

I claim as my invention:—

A gasolene strainer comprising a pair of hemispherical members having edges in abutment, and a strainer proper bridging the open interior space of one of the said members, and an inlet connection provided on one of the said members and an outlet connection provided on the other of the said members, and securing means comprising a screw axially positioned and operative to hold the said members together, one of the said members provided with an axial flushing outlet, and the said screw normally filling the said flushing outlet.

ALBERT D. ELSTER.

Witnesses:
  SHEFFIELD H. CLARKE,
  ROGER EDWARDS.